United States Patent [19]

Otto

[11] Patent Number: 4,852,071
[45] Date of Patent: Jul. 25, 1989

[54] AIR SUPPLY VALVE FOR SEISMIC AIR GUN

[75] Inventor: Bernard Otto, Arlington, Tex.

[73] Assignee: Mobil Oil Corporation, New York, N.Y.

[21] Appl. No.: 124,637

[22] Filed: Nov. 24, 1987

[51] Int. Cl.⁴ .............................................. G01V 1/04
[52] U.S. Cl. .................................. 367/144; 181/120; 251/129.12
[58] Field of Search ............... 181/115, 117, 118, 119, 181/120, 113; 367/144, 146; 251/129.11, 129.12, 129.13, 311, 315; 174/101.5

[56] References Cited

U.S. PATENT DOCUMENTS

| | | | |
|---|---|---|---|
| 3,680,831 | 8/1972 | Fujiwara | 251/129.12 |
| 4,097,786 | 6/1978 | Lund | 251/129.11 X |
| 4,381,044 | 4/1983 | Kirby | 181/118 |
| 4,525,813 | 6/1985 | Burrage | 367/144 X |
| 4,599,712 | 7/1986 | Chelminski | 367/144 |
| 4,623,033 | 11/1986 | Harrison | 181/120 |
| 4,757,482 | 7/1988 | Fiske | 367/144 |

*Primary Examiner*—Brian S. Steinberger
*Attorney, Agent, or Firm*—Alexander J. McKillop; Charles J. Speciale

[57] ABSTRACT

A marine seismic array wherein each air gun in the array is provided with an air supply valve that can be closed remotely to inactivate a particular air gun and then reopened upon command to reactivate the gun without retrieving the array. The valve is comprised of a housing having a ball valve therein which is rotated between an open and closed position by a reversible, electric motor in the housing upon the flowing of current to the motor in either a first direction or in an opposite direction. Limit means are provided in the housing to stop the motor when the ball valve rotates to either a full open or a full closed position.

4 Claims, 2 Drawing Sheets

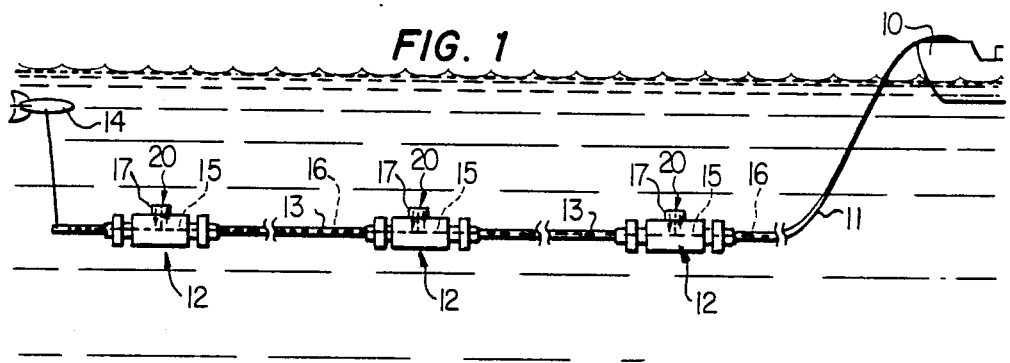
FIG. 1
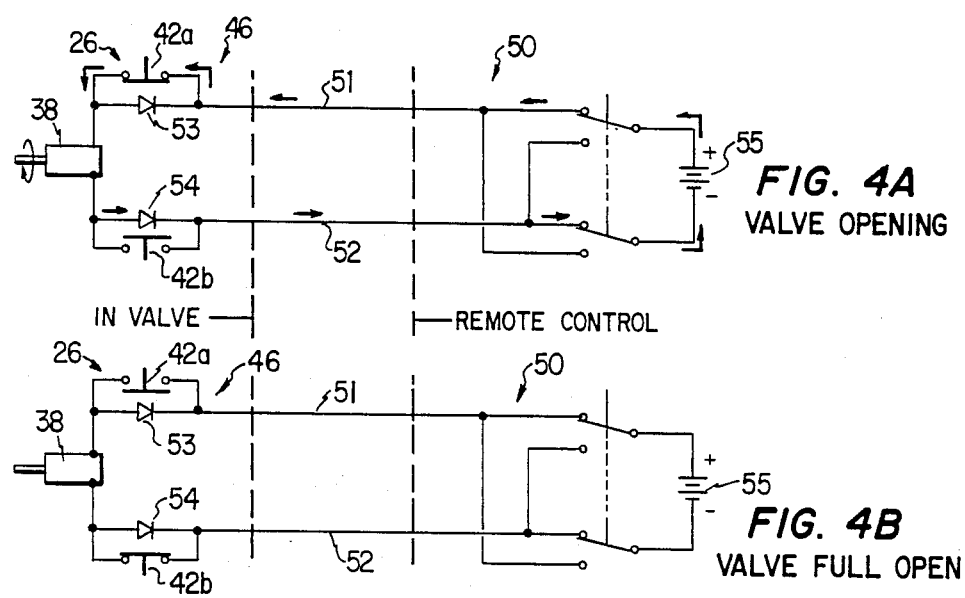
FIG. 4A VALVE OPENING
IN VALVE — — REMOTE CONTROL
FIG. 4B VALVE FULL OPEN
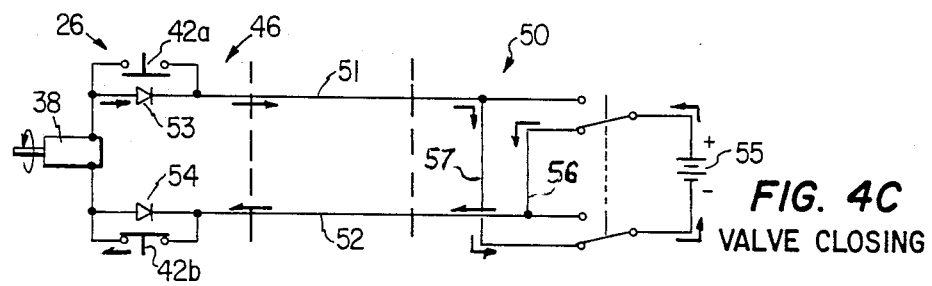
FIG. 4C VALVE CLOSING
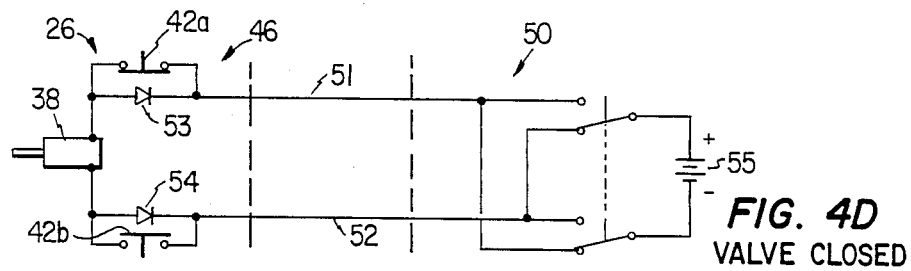
FIG. 4D VALVE CLOSED

AIR SUPPLY VALVE FOR SEISMIC AIR GUN

DESCRIPTION

1. Technical Field

The present invention relates to an air supply valve and more particularly relates to marine seismic array having a valve that can be remotely closed to interrupt the flow of air to a marine seismic air gun in the array and then reopened upon command to resume operation of said air gun.

2. Background Act

In marine seismic surveys, an acoustical energy source generates sonic pulses or shock waves in the water which travel downward in the water, through the water bottom, and through the earth formations underlying the bottom. Part of the acoustical waves passing though the earth formations underlying the bottom are reflected upward therefrom and are sensed by sensors, (e.g. streamers of hydrophones) which convert the acoustical waves to electronic signals. The streamer(s) are normally towed by the same vessel that is towing the acoustical energy source. The reflected signals are then conditioned and processed to provide valuable information both as to the composition of the various formations and to the possibility that such formations may contain mineral desposits such as hydrocarbons.

Several different types of acoustical energy sources have been used in the past to produce the shock waves required in seismic surveys. For example, in recent years, a type of acoustic energy source known as an "air gun" has come into widespread use and has achieved a high degree of success. In an air gun, a charge of compressed air under high pressure, e.g. 2000–6000 psi, is supplied to a chamber in the gun. When fired, the chamber rapidly opens to discharge the charge of air inoo the water thus producing the shock wave. The chamber then closes and is repressured with air and the firing is repeated as often as desired.

In a typical prior art marine seismic array, several air guns are spaced along an air hose assembly which supplies the necessary compressed air from a towing vessel to each of the air guns. The air hose assembly may consist of a single passage which supplies air to all of the air guns or the hose assembly may consist of individual air passages for each gun. In either case, a shut-off valve is normally positioned in the hose between the air compressor and the air gun. The shut-off valve is mounted on the air gun when the air hose assembly consists of a single passage. The shut-off valve is mounted on the towing vessel, the air gun, or somewhere in between when the air hose assembly consists of individual passages for each air gun. Each shut-off valve is set in an open position when the array is deployed from the vessel so that a continuous supply of air is always available at each gun. If it becomes necessary or desirable to deactivate a particular gun, the shut-off valve associated with that gun is closed to block air flow. By closing the appropriate air supply valve or valves, one or more guns can be inactiviated without affecting the operation of the other guns in the array.

However, in known prior art arrays, once an air gun mounted shut-off valve is closed, it cannot be remotely reopened and the gun associated therewith must remain inactive until the hose assembly is retrieved and the shut-off valve is manually reopened. In those instances where one or more guns need only to be inactivated temporarily during a sustained seismic survey, it can be seen that a need exists for an air supply valve that can be quickly and remotely opened and closed upon command from the vessel.

DISCLOSURE OF THE INVENTION

The present invention provides a marine seismic array wherein each air gun in the array is provided with an air supply valve that can be closed remotely to inactivate a particular air gun and then reopened upon command to reactivate the gun without requiring the array be retrieved on board the vessel.

More specifically the present invention provides a marine seismic array which is adapted to be towed by a vessel wherein the array comprises a plurality of air guns spaced along an array bundle which includes a central air hose assembly that supplies compressed air to each of said air guns through individual air passages. An air supply valve is positioned in each individual air passage to control the flow of air from the central air hose assembly to the air gun. The air supply valve is comprised of a housing having an inlet and an outlet connected together by a passage in the housing. Valve means, e.g. a ball valve, is positioned in the passage and has a bore therethrough which when the valve is in an open position is aligned with the passage in the housing and which when the valve is in a closed position is positioned at approximately 90° from said passage.

A valve actuating means, e.g. a reversible, electrical motor, is mounted in the housing and is connected to said valve means by a coupling whereby the motor will rotate said valve means to an open position when rotated in a first direction and to a closed position when rotated in the opposite direction. Circuitry is provided that allows electrical current to flow through the motor in a first direction when a remote switch is in a first position to move the valve means toward said open position and to flow through the motor in an opposite direction when said remote switch is in a second position to move said valve means toward a closed position. Limit switches are properly positioned within the housing to stop the motor when said valve means has been moved to a full open or a full closed position.

In operation, current is flowed to the motor in the housing to rotate the valve to an open position. The limit means stops the flow of current when the valve reaches a full open position. If a particular air gun in the array malfunctions or if certain guns are to be inactivated during a particular operation, current is flowed in an opposite direction to the valve(s) of the affected guns(s) to rotate the valve(s) to a closed position to shut off the air supply to the guns(s). If or when it is desired to reactuate the gun(s), it is only necessary to again flow current in the first direction to the motor to reopen the valve.

BRIEF DESCRIPTION OF THE DRAWINGS

The actual construction, operation, and apparent advantages of the present invention will be better understood by referring to the drawings in which like numerals identify like parts and in which:

FIG. 1 is an illustration of a marine seismic source air gun array in accordance with the prior art;

FIGS. 4A–4D are schematical views of the switching circuitry of the present invention in various operating positions during the opening and closing of the air supply valve of FIGS. 2 and 3.

BEST MODE FOR CARRYING OUT THE INVENTION

Figure 2:
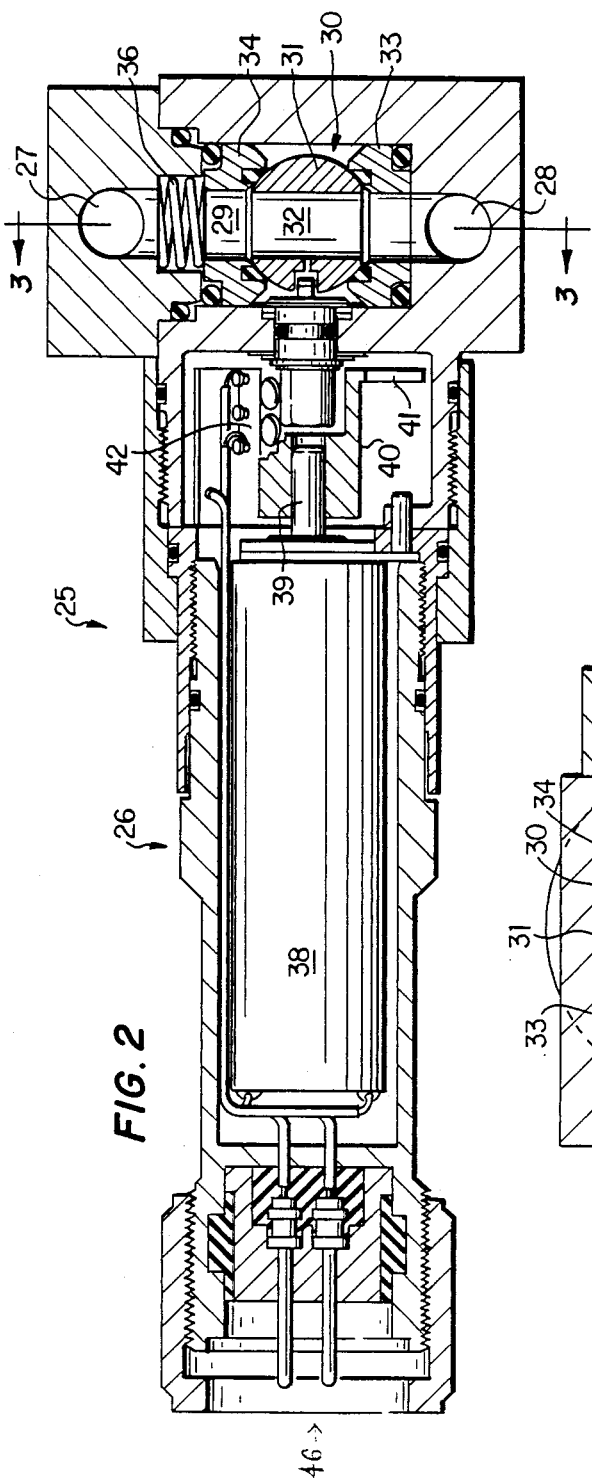
FIG. 2 is a longitudinal sectional view of the air supply valve of the present invention.

Referring more particularly to the drawings, FIG. 1 discloses one type of a seismic source array or subarray used to carry out a marine seismic survey. An array is normally comprised of one or more subarrays. The array is towed by a vessel 10 and is comprised of a plurality of air guns 12 which are spaced and are joined together by lengths of array bundle 13 and maintained at a desired depth by a paravane 14 or the like. The particular details of guns 12 and array bundle 13 are not considered to form a part of the present invention and, accordingly, will only be briefly described. As illustrated, gun 12 has a central bore 15 through the housing thereof which is connected at each end to the main air supply passage or central air hose assembly 16 in array bundle 13 whereby the bore in the housing forms a continuous passage through the array. Individual passage means 17 are provided at each gun 12 which allows air to flow from air hose assembly 16 to charge each gun for firing upon command. For a complete description of the illustrated array and the details of an air gun used therewith, see copending U. S. Pat. No. 4,715,023, issued Dec. 22, 1987.

In arrays such as that described above and in other prior art arrays wherein the air guns are spaced and suspended below the air hose bundle (for examples, see U.S. Pat. Nos. 3,893,539 and 4,313,392), an air supply valve, e.g. 20 in FIG. 1, is positioned somewhere in each individual air passage 17 to control the flow of air from main air passage 16 in bundle 11 to a respective gun 12. However, in known prior art arrays, valves 20 are all set in an open position when the array is deployed from vessel 10. If a particular gun 12 malfunctions or if a need arises to inactivate a gun, the valve associated with that gun is closed remotely by command from vessel 10. However, once a valve 20 is closed, it cannot be remotely opened so the affected gun 12 must remain inactive until the array is retrieved aboard the vessel.

Figure 3:
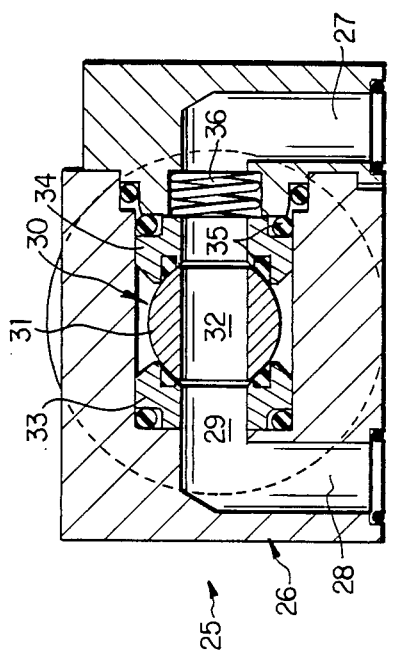
FIG. 3 is a sectional view taken along section line 3—3 of FIG. 2.

In accordance with the present invention, FIGS. 2 and 3 disclose an air supply valve 25 capable of being used to control air flow through an individual air supply passage 17 of seismic array 11 whereby the valve can be remotely closed and opened repeatedly upon command. This permits an air gun 12 to be both remotely deactivated and reactivated without retrieving the array.

Referring more particularly to the drawings, FIGS. 2 and 3 disclose air supply valve 25 having a housing 26 which, in turn, has an inlet 27 adapted to be fluidly connected to a source of compressed air and an outlet 28 adapted to be connected to the air inlet of gun 12. Valve means 30 is positioned in passage 29 which connects inlet 27 to outlet 28. As illustrated, valve means 30 is preferably a ball valve 31 having a bore 32 therethrough. When valve 25 is in an open position, bore 32 will align with passage 29 and when valve 25 is closed, bore 32 will be rotated 90° with respect to passage 29. Ball valve 31 is rotatably positioned between valve seats 33, 34, respectively, and has appropriate seals 35 associated therewith. Seat 34 is normally biased into contact with ball valve 31 by spring 36 to "self-adjust" or compensate for any wear on seals 35.

A means for actuating valve means 30 (e.g. reversible electric motor 38 such as TRW No. 43A113-14) is mounted in housing 26 and has a shaft 39 which is connected to ball valve 31 by means of coupling 40 which, in turn, carries limit arm 41. Two contact or "limit" switches 42 (only one shown in FIG. 2) are mounted approximately 90° apart within housing 26 and are positioned to be engaged and actuated by limit arm 41 when coupling 40 is rotated by motor 38. Motor 38 has a connector 45 which is adapted to be connected to an electrical circuitry 46 (FIGS. 4A–4D) which is mounted within housing 26 and which is adapted to be connected to individual electrical conductors 51, 52 which extend from an electrical power source 55 aboard vessel 10 and are carried by array bundle 13 to each of guns 12.

The operation of valve 25 is as follows: Referring now to FIGS. 4A–4D, a remote double contact switch 50 is positioned on vessel 10 and is connected to a valve 25 by electrical conductors 51, 52. Circuitry 46 located at valve 25 include rectifier diodes 53, 54 which allow flow of current in only one direction (left to right in figures) while preventing current flow in the other direction. Rectifier diodes 53, 54 are wired in parallel with limit switches 42a, 42b, respectively.

To open valve 25, switch 50 is moved to a first position (FIG. 4A) which allows current to flow from electrical power source 55 through conductor 51, closed limit switch 42a, motor 38, rectifier diode 54 and back through switch 50 through conductor 52. The flow of current to motor 38 causes it to rotate in a first direction to rotate ball valve 31 through coupling 40. As bore 32 in ball valve 31 aligns with passage 29, limit arm 41 rotates into contact with limit switch 42a, causing limit switch 42a to open. Limit switch 42b is spring loaded in such a manner that it closes as limit arm 41 rotates away from it and toward limit switch 42a (FIG. 4B). In this position, no current can now flow to motor 38 which stops with valve 25 in a full open position. This is the position in which valve 25 would normally be during seismic operations carried out by array 11 (FIG. 1).

If it becomes necessary to close valve 25, remote switch 50 is moved to a second position (FIG. 4C). Current now flows from source 55 through conductors 56, 52, closed limit switch 42b, motor 38, rectifier diode 53, conductors 51, 57, and back through switch 50. The flow of current in the opposite direction through reversible motor 38 causes it to rotate in the opposite direction to rotate bore 32 in valve 31 out of alignment with passage 29 thereby closing valve 25. Arm 41 will rotate with coupling 40 to thereby contact limit switch 42b to open same and allow limit switch 42a to close (FIG. 4D). This stops motor 38 with valve 25 in a full closed position. To reopen valve 25, remote switch 50 merely has to be moved back to the first position (FIG. 4A).

It can be seen from the above description, the present invention provides an air supply valve which can quickly and easily be open or closed from a remote station so that any particular air gun in a marine seismic array can be actuated and deactuated on command.

What is claimed:

1. In a marine seismic array adapted to be towed by a vessel wherein the array is comprised of a plurality of air guns spaced along an array bundle which includes a central air hose assembly that supplies compressed air to each of said air guns through individual air passages which extend between said central air hose assembly and each of said air guns; the improvement comprising:

an air supply valve positioned in each of said individual air passages, said air supply valve comprising:

a housing having inlet and an outlet and a passage in said housing connecting said inlet and said outlet;

valve means positioned in said passage in said housing;

valve actuating means in said housing for moving said valve means from an open position to a closed position and from a closed position to an open position; said open position allowing the flow of air from said central air hose assembly through an individual air passage to an air gun associated therewith and said closed position blocking the flow of air therethrough; and means for remotely actuating said valve actuating means from said vessel to close said valve to deactivate said air gun and to reopen said valve to reactivate said air gun whereby each of said plurality of air guns can be individually inactivated and reactivated remotely from said vessel;

and wherein said valve means comprises: a ball valve rotatably mounted in said housing having a bore therethrough which is aligned with said passage in said housing when said air supply valve is in said open position and is at 90° with respect to said passage when said air supply valve is in said closed position.

2. The marine seismic array of claim 1 wherein said valve actuating means comprises:

a reversible, electrical motor mounted in said housing and having a shaft extending therefrom; and a coupling connecting said shaft to said ball valve.

3. The marine seismic array of claim 2 wherein said means for actuating said valve means comprises:

means for flowing electrical current through said reversible, electrical motor in a first direction to cause said motor to rotate in a first direction to thereby move said ball valve toward an open position and for flowing electrical current through said reversible, electrical motor in an opposition direction to cause said motor to rotate in a counter direction to thereby move said ball valve toward a closed position.

4. The marine seismic array of claim 3 further including:

limit means in said housing for stopping flow of electrical current to said motor when said ball valve is moved to a full open position; and limit means in said housing for stopping flow of electrical current to said motor when said ball valve is moved to a full closed position.

* * * * *